US009779571B2

(12) United States Patent
Chong (10) Patent No.: US 9,779,571 B2
(45) Date of Patent: Oct. 3, 2017

(54) METHOD, SYSTEM, AND COMPUTER-READABLE MEDIUM RELATING TO INTERNET OF THINGS-ENABLED REMOTE CONTROLS

(71) Applicant: Kyu Han Chong, Tysons Corner, VA (US)

(72) Inventor: Kyu Han Chong, Tysons Corner, VA (US)

( * ) Notice: Subject to any disclaimer, the term of this patent is extended or adjusted under 35 U.S.C. 154(b) by 0 days.

(21) Appl. No.: 14/702,672

(22) Filed: May 2, 2015

(65) Prior Publication Data

US 2015/0262443 A1 Sep. 17, 2015

(51) Int. Cl.
*G07C 9/00* (2006.01)
*G08C 17/02* (2006.01)
*H04W 4/00* (2009.01)
*H04W 4/12* (2009.01)

(52) U.S. Cl.
CPC ......... *G07C 9/00896* (2013.01); *G08C 17/02* (2013.01); *H04W 4/005* (2013.01); *H04W 4/12* (2013.01); *G07C 9/00309* (2013.01); *G07C 2009/00928* (2013.01); *G08C 2201/30* (2013.01); *G08C 2201/42* (2013.01); *G08C 2201/93* (2013.01)

(58) Field of Classification Search
CPC combination set(s) only.
See application file for complete search history.

(56) References Cited

U.S. PATENT DOCUMENTS

2012/0166610 A1* 6/2012 Doh ................. H04L 67/12
709/223
2015/0032890 A1* 1/2015 Bott ................. G06F 21/552
709/224

* cited by examiner

*Primary Examiner* — Kabir A Timory

(57) ABSTRACT

The disclosed technology relates to transforming an ordinary remote control into an IoT device. IoT provides an opportunity to enable and extend traditional technology products in seamless and cost-effective ways. As an example, a remote control for garage door openers is transformed, thereby allowing users of smart phones to remotely activate the garage door openers from anywhere in the world. The transformation virtually eliminates installation and integration difficulties, without losing any functionality. The IoT-powered devices also opens the opportunity of whole world of M2M automation and benefits, such as automatically closing all garage doors after 9 PM or when people are away from the home. This technology further enables the power of smart phones, connected watches, tablets, IoT and M2M devices disruptively, changing how we live and interact with machines.

3 Claims, 10 Drawing Sheets

800. Flowchart

Figure 2 - 200. Couple with IoT Device

Figure 5 - 500. Examples of Circuit using Optocoupler

Figure 7 – 700. Solder Shaped and Wire Brush Pogo Pins

Figure 9 - 900. Side view of coupled remote control circuit Board

METHOD, SYSTEM, AND COMPUTER-READABLE MEDIUM RELATING TO INTERNET OF THINGS-ENABLED REMOTE CONTROLS

BACKGROUND

Field of the Invention

The present invention relates generally to an Internet-of-Things (IoT) device equipped with electronics, software, sensors, and connectivity to achieve greater value and service.

The invention transforms a traditional remote control (RC) into an IoT device that leverages the functionality of smartphones, tablets, and the Internet. More specifically, the invention transforms the RC into an IoT device that remotely controls movable barriers, such as garage doors, over the communication network.

The term traditional refers to non-Internet-enabled pre-IoT devices lacking integration with smart phone, tablet, M2M, and computer GUI interface.

Description of the Related Art

Related art devices electronically coupled directly to a movable barrier. These embodiments require direct attachment of 2 wires to movable barrier devices such as garage door openers. The embodiments can include radio frequency (RF) wireless receivers, a wireless gateway for translating different data network protocols, and sensors to detect the status of the movable barrier. These prior arts require one embodiment per movable barrier. Electronically coupling and managing multiple embodiments directly to a movable barrier is costly, problematic, challenging, and confusing. These prior arts can only detect two positions, close and open, using a sensor mounted on the door. By detecting the precise location of the door with multiple sensors, it is possible to achieve new use cases.

Vehicular related art (U.S. Pat. No. 4,731,605 and U.S. Pat. No. 5,699,065) electronically couples a garage door remote control (GDRC) with an automobile. Both require a manual user interaction to activate the switch. Related art U.S. Pat. No. 4,731,605 is based on single-pole activation button switch. Related art U.S. Pat. No. 5,699,065 is based on a switch, such as high beam control switch.

Home video recorder-related art (US 2007001887) to operate modified RC transmitter functions using an external occupancy sensor within one room. Related art device [004] uses a switching device that in turn provides parallel contact closures to an internal RC transmitter switch that is normally activated by pressing the intended function on an RC transmitter. The related art uses complementary metal-oxide semiconductor (CMOS) switches, logic-levels, or contact closures. Related art [004] modifies an RC transmitter with wiring, optics, or jacks on the RC transmitter. This related art is based on a CMOS switch simulating a button push per broader claims made in a prior patent (U.S. Pat. No. 5,699,065).

Other vehicular related art (US 2014/0320263) couples with a vehicular control system over the wireless data network and uses RF transmission to activate a GD opener.

Related art for pogo pins comes in different shapes and sizes, but none to date accommodate different lengths of electronic component pins sticking out of irregularly sized and shaped solder bumps.

Thus, it would be desirable to provide a low cost means for enabling the RC functions over the Internet with a simple coupling of old and new technologies. In particular, it would be desirable to provide embodiments of integrated home automation that allow additional sensors, systems, methods, and technology.

Key features and characteristics of the present invention will become apparent from the subsequent Detailed Description, Brief Description of the Drawings, and the appended Claims. Statements in this section shall not be considered an admission of prior art teaching.

SUMMARY

The subject invention transforms an RC into IoT device enhancing overall functionality. Users can use smartphone, tablet, or computer applications from anywhere in the world to activate any combination of the RC functionality. The invention directly couples with a respective RC to activate movable barriers and other devices such as ceiling fans, home door locks, automotive door locks, electric heaters, and lights with integrated sensors.

The invention uses the new coupling techniques as listed below in conjunction with IoT enablement.

Figure 1:
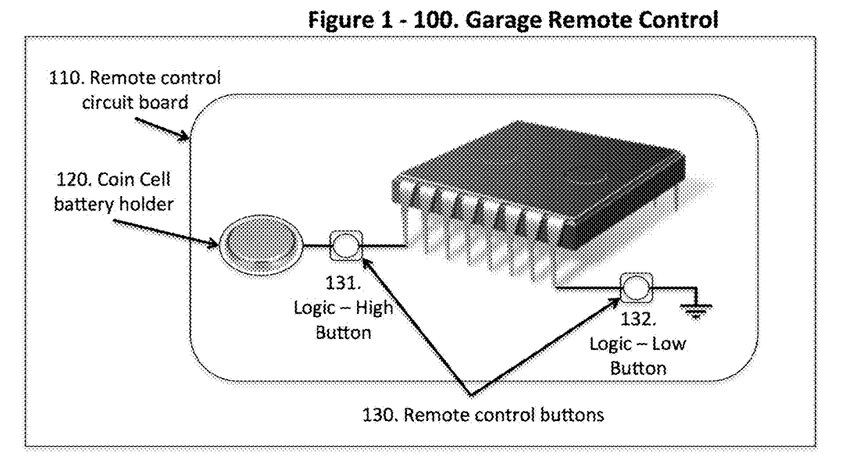
Figure 2:
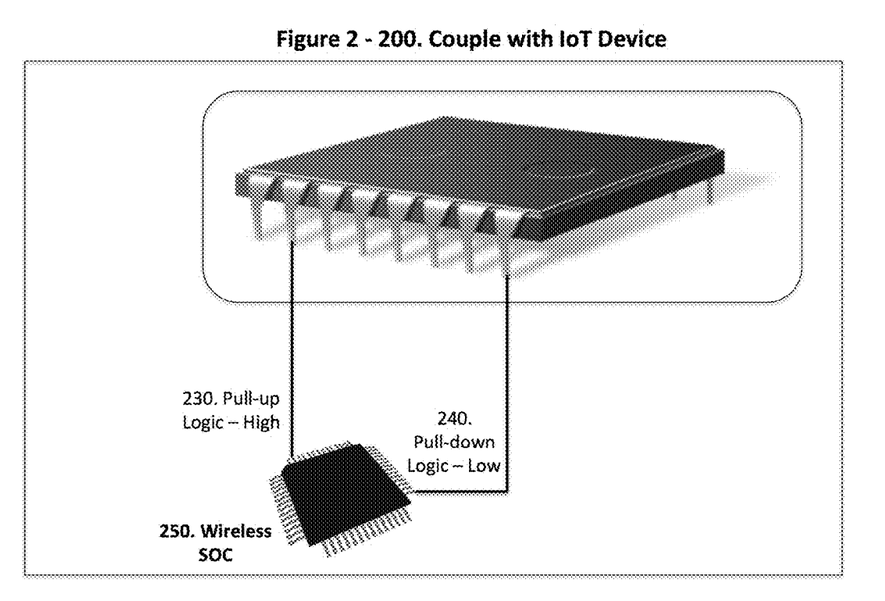
Figure 3:
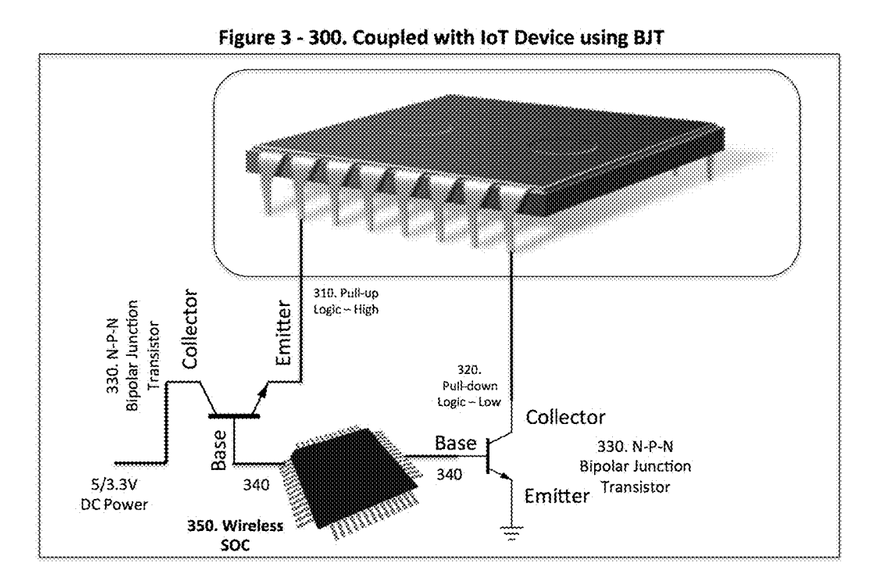
Figure 4:
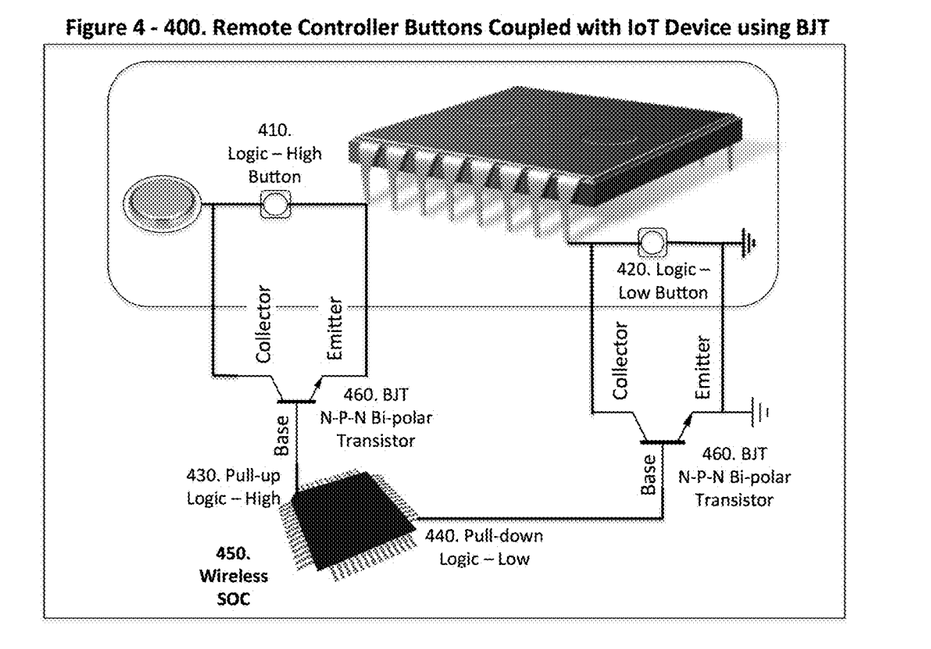
FIG. 4 depicts an embodiment that simulates a button push using N-P-N BJT.
Figure 5:
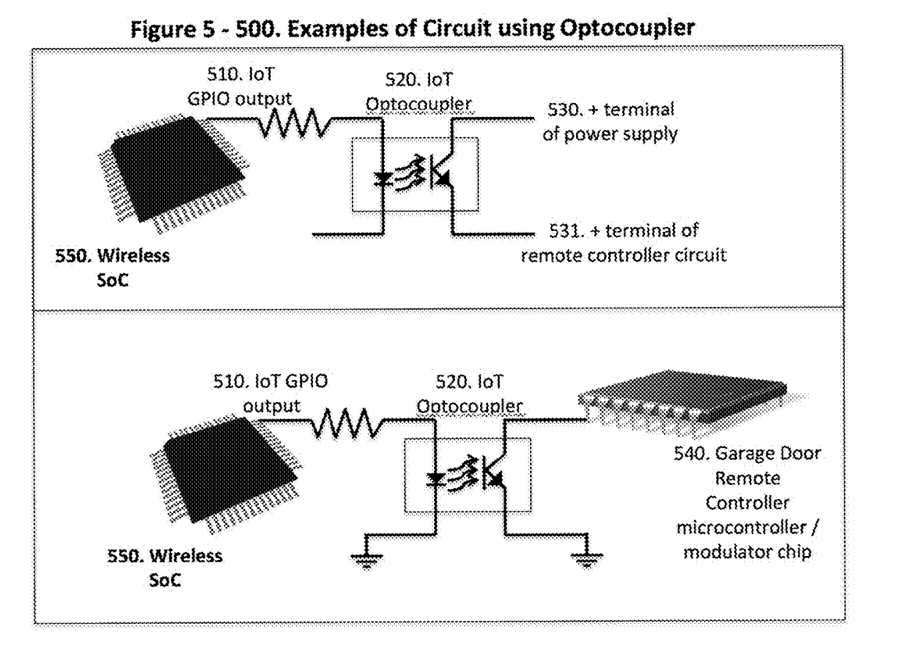
FIG. 5 depicts embodiments that employ an optocoupler instead of N-P-N BJT. These embodiments can be used to replace BJT in FIG. 3 or 4.
Figure 6:
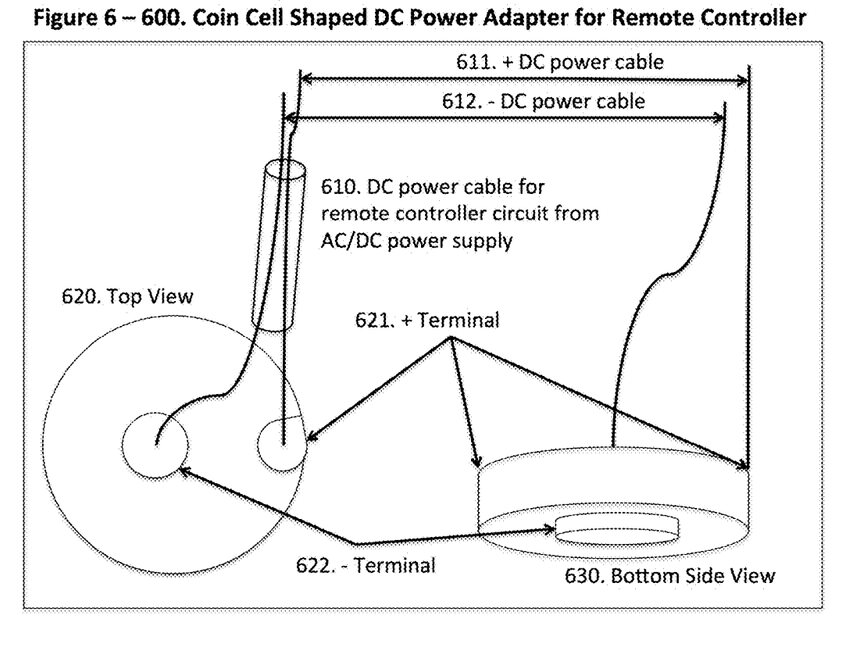
FIG. 6 depicts a coin cell-shaped DC (direct current) power adapter. This adapter comprises a DC power cable (610) from the AC (alternating current)/DC power supply. This DC power line has + and − cables and connects to terminals (621 and 622). (620) depicts a top view of the coin cell-shaped adapter. 630 depicts bottom and side views. Other GD RCs use different quantities, shapes, and types of adapters, with different voltage, such as that from a 9 v rectangular-shaped battery.
Figure 7:
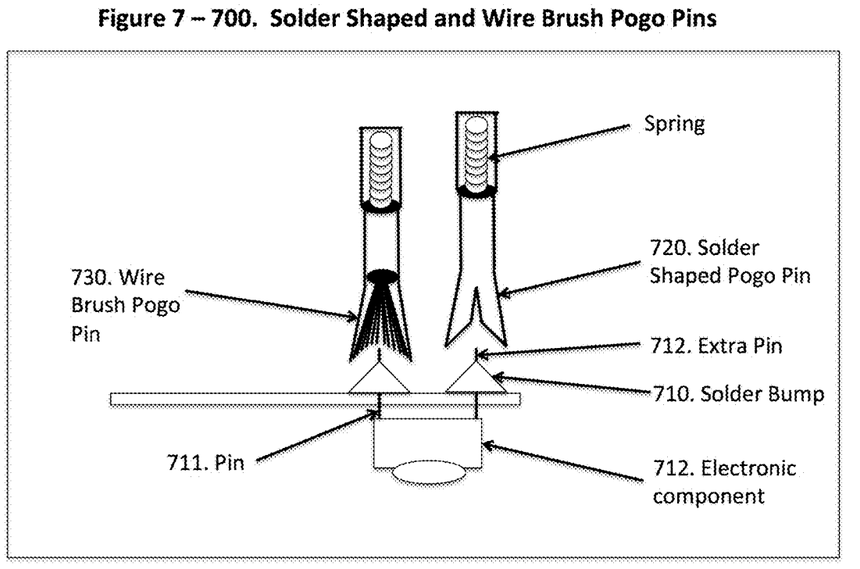
Figure 8:
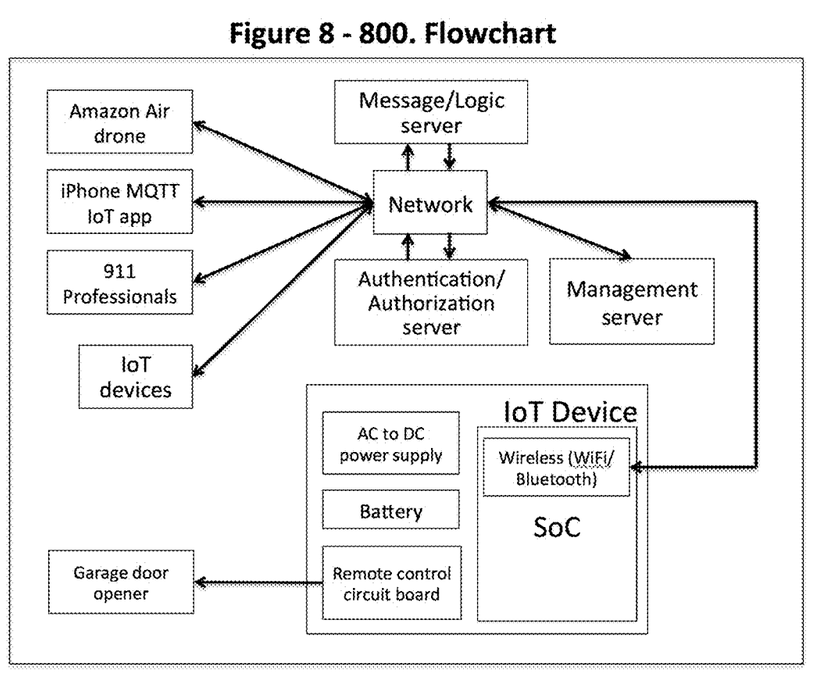
Figure 9:
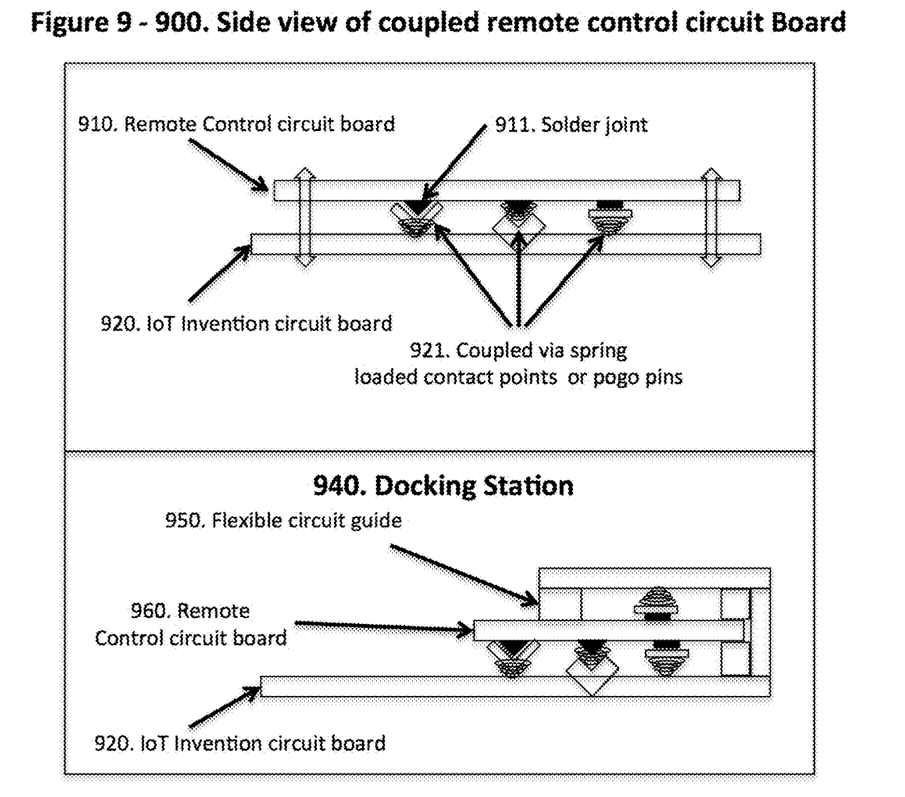
Figure 10:
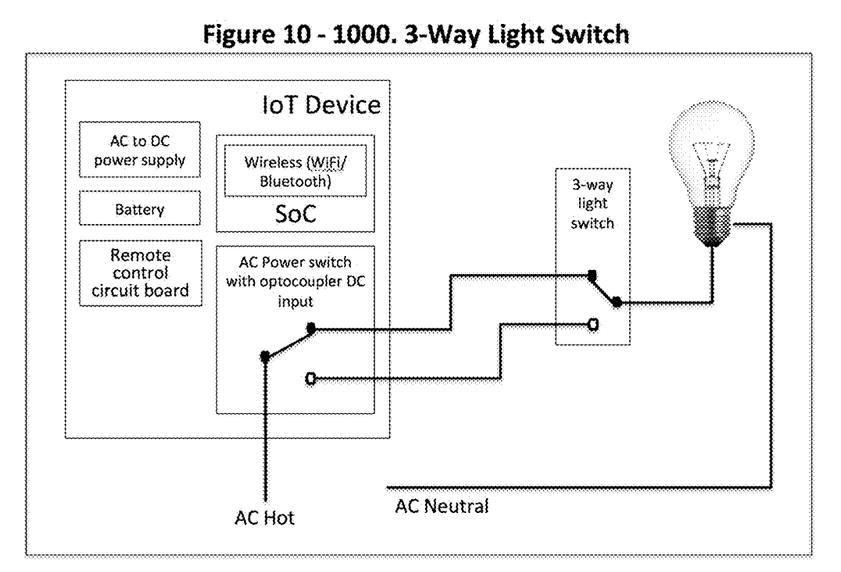
FIG. 10 depicts a departure from the previous use cases: a SoC coupled with a commercially available AC switch/relay controlled by a DC input simulating a 3-way light switch. The SoC logic level output drives the DC input of the AC switch for selecting the position of the switch. An optocoupler similar to FIG. 5 isolates AC from DC. This configuration demonstrates the use of a GUI interface and commercially available switches to operate a light bulb, thereby seamlessly integrating IoT with an existing infrastructure.

1. Direct chip-to-chip connection coupling the IoT invention with existing RC. (FIG. 2)
2. Direct chip-to-chip connection coupled using a bipolar junction transistor (BJT). (FIG. 3)
3. Simulating button push using BJT. (FIG. 4)
4. Direct chip-to-chip connection coupled using an optocoupler to isolate the circuit. (FIG. 5)
5. In addition to BJT, an optocoupler can further isolate the circuits.
6. Use of pogo pins, arched contact plates and/or docking station to seamlessly couple with the RC.
7. Use of a battery-shaped connector to provide power as needed to minimize false activation.

The IoT System-on-Chip (SoC) output and/or input pins directly couples to input pins of the microcontroller and/or modulator chips on an RC circuit board (RCCB). The coupling is done using standard pogo pins or newly engineered solder-shaped or wire-brushed pogo pins to center and enhance overall contact. Direct current (DC) power is provided to the RC using a battery-shaped connector. This battery-shaped connector is inserted into the battery holder of the RC. The SoC controls the power to the RC. Power is controlled and provided, as needed, thereby eliminating false-positive activation of GDs.

The SoC can be configured to support one or more of the following protocols: MQTT (Message Queue Telemetry Transport), AMQP (Advanced Message Queuing Protocol), STOMP (Simple/Streaming Text Oriented Messaging Protocol), WebSTOMP, and REST (Representation State Transfer) protocols. In addition, a rule-based logic server can automatically activate the movable barrier as programmed, fully using machine-to-machine (M2M) IoT functions. As an example, when a logic server is programmed to close the GDs and lock the doors at a specific time, the MQTT message is crafted and sent by the logic server to the message server for immediate execution. The message server then disseminates the message to subscribing devices and user applications. In addition, IoT devices equipped with sensors can provide information to the logic server via the communication network. Sensor data is processed and used to determine the best course of action during which the logic server issues the commands to other IoT devices.

BRIEF DESCRIPTION OF THE DRAWINGS

Other objects, features, and advantages of the invention will be apparent from the following description when read with reference to the accompanying drawings. In the drawings herein, reference numerals denote corresponding parts throughout the several views.

FIG. 1 depicts two examples of GD RC circuit board (CB) (110). One type of GD employs logic-high inputs, and another type employs logic-low inputs to activate the RC. A coin cell battery holder (120) provides power to a logic-high button (131). The logic-low button (132) is connected to ground. When the appropriate button is pushed, the logic-high state created by the RC chip is pulled down to logic-low state. These buttons (130) represent each movable barrier. Two buttons are shown as an example, but not limited to, additional configuration. Because the battery is unnecessary and therefore removed, the external power supply provides power to both this invention and the RC CB. Power supply voltage and amperage can vary based on specifications of the RC circuit requirements and design.

FIG. 2 depicts the embodiment where SoC (250) is coupled with an encoder chip on the GD RC CB. Diagram 200 depicts two different types of configuration. In the first configuration, logic-high is set using pull-up (230). This state activates the RC. This activation is done without involving RC buttons, solid-state switches, and/or electro-mechanical switches. In the second configuration logic-low is also set via SoC, without using any CMOS switches, logic levels, or contact closures.

FIG. 3 depicts an embodiment using N-P-N BJTs. For pull-up (230) type of RC, BJTs supply voltage from the power supply to the input pin of the RC microcontroller/modulator. An output (340) from a wireless SoC enables the BJT to send the proper voltage to the input pin. For the pull-down type of RC, the N-P-N BJT changes the state of the input pin from logic-high to logic-low. An output (340) from the SoC (350) activates the BJT transistor, which in turn activates the RC. One of these circuits is required if the SoC is unable to provide or sink adequate voltage or current. Circuit design to enable encoding chip input can vary based on the model of the chip and the engineering of the RC CB.

In FIG. 5, the upper circuit diagram depicts SoC output driving the optocoupler to supply power from the power supply to the RC. The lower circuit diagram depicts the SoC driving the optocoupler to pull down the output of the GD controller microcontroller or modulator chip pin to ground. In this case, the GD RC chip requires the pins to be grounded for the GD RC to activate the wireless signal to operate the GD opener. When the GD RC requires the pins to be supplied with logic or high voltage, the optocoupler can further isolate the GD RCCB.

FIG. 7 depicts two new types of pogo pins. The first type is a solder-shaped pogo pin (720) that centers and accommodates an extra pin (712) that sticks out of the solder bump (710). These pogo pins couple with the GD RC providing electrical connections with the SoC CB of the invention. Other connection points (711) and flat joints are connected via commercially available technology such as pogo pins, arched contacts, and/or cold solder paste. RCCB and the invention can also be soldered together.

Flowchart FIG. 8 depicts a use case in which a user activates the GD using an iPhone application. The signal travels to the Wi-Fi router over the data network, and then to the message server. As a "garage door" message subscriber to the message server, the IoT device will receive the message using a specified quality of service (QoS). The IoT device can check other sensors or activate warning alarms (visual and audible) prior to activating the RC microprocessor/modulator. As the final step, the RC sends a signal to the GD opener to activate it.

FIG. 9 depicts the completed embodiment of the RCCB (910) and the SoC CB (920). The top embodiment depicts two CBs (910 and 920) attached together with spring-loaded contact points or pogo pins. Arched contact plates and a battery-shaped power adapter can be used in conjunction with pogo pins. The bottom embodiment depicts the RCCB (960) sliding into an IoT embodiment that is similar to a docking station (940).

DETAILED DESCRIPTION

This invention embraces the power of IoT for traditional technology devices, introducing M2M, communication network, and mobile user interfaces. Coupling a traditional RC with, for example, Wi-Fi and Bluetooth-enabled SoCs fully enable the functionality of the IoT. The term traditional refers to non-Internet-enabled pre-IoT devices lacking integration with smart phone, tablet, M2M, and computer GUI interface. This invention specifically brings forward integration of AC power sensors (049), a seamless docking station (021), new pogo pins (019), a battery-shaped power adapter (018), chip-to-chip (microcontroller-to-microcontroller) interconnection (008), multi-factor authentication (045), authorization of users and machines, a M2M user interface, M2M interaction with unmanned autonomous devices, and, lastly, interaction with devices of 911 emergency response professionals.

For example, GD RC comprises a microcontroller and/or modulator chip. The chip activates the signal to the GD opener when the desired input signal is presented to its input pins. The most common two types are pull-up and pull-down. In the case of pull-up, the input is anticipating a change from near 0 to 3.3 volts. In the case of pull-down, 3.3 v or high voltage is supplied by the chip and anticipates near 0 voltage by grounding the pin to 0 volt (− terminal of the power supply). In both cases, having the same ground and power reference is critical. The invention's microcontroller resides inside the SoC. The SoC couples directly with the input pin of the microcontroller chip on a GD RC circuit where they both share the same power.

The CB is removed from the existing GD RC to be coupled with the IoT invention. Any RC with input pins on microcontroller and/or modulator chip can be coupled with this IoT invention to perform any combination of original functions. For example, this invention can operate the GD opener to open the door to a specific height and duration in order for Amazon PrimeAir drones or a delivery person to place the item inside the garage. The door lock between the garage and the main part of the house can be engaged prior to opening the GD for delivery.

The extracted RC CB (after removing battery(s)) is coupled with this IoT invention without soldering to make a contact to operate movable barrier(s). This IoT invention CB couples with the RC CB by using a simple slide in enclosure or attached together. The electrical connection points can be spring loaded (pogo pins) or arched metal plates to enhance contacts. Depending on the size and shape of the solder joints, as well as male (soldered pins), female (holes), or flat surfaces, contact solutions are custom designed per each type of RC. This invention can use flexible contacts accommodating solder holes or pins to self-center the contact based on shape of the soldered contacts and other contact points.

This invention can be equipped with sensors to detect human presence near the GDs, physical position of GDs, time-of-the-day, light condition, and automated settings and schedules.

This invention also does not require that the user be in a same room as the device being controlled. This invention does not require direct electronic connections to the movable barrier opener and can be located anywhere within the range of the RC to operate the movable barrier devices, such as GD opener. This invention must be in a range of an Wi-Fi access point (AP) or other network protocol hub in order to be operated by smart phones, tablet, or other Wi-Fi or Bluetooth-enabled controlling devices.

This invention is not limited to Wi-Fi or Bluetooth. The invention can use any combination of wireless technology such as LTE, 3G, Z-Wave, ZigBee, Insteon, EnOcean, AllJoyn, NFC, ANT+, DECT-ULE, and/or Bluetooth (Smart).

This invention can use any wired or wireless bi-directional data communication network, including Internet, cellular, satellite, and microwave.

This invention can use any protocol, including UDP/IP and TCP/IP.

This IoT device also provides power to the RC without requiring battery replacement. By electrically combining both power and circuits, proper direct chip-to-chip connection is possible.

This IoT invention employs electromechanical buttons and LED light indicators to test and verify the contacts to RC.

The RC CB can slide into a socket, making proper electrical contact and coupling with the invention's docking station.

Screw holes and openings are used to attach the RC CB with the IoT CB.

The IoT invention activates the RC by using SoC output/input (using pull-up and pull-down), BJT, or optocoupled transistors. These SoC outputs/inputs are specifically timed for the respective coupled RC specification.

BJT is used instead of unipolar CMOS, which consists of N and P channel MOSFET (metal-oxide-semiconductor field-effect transistor) switches.

The IoT invention can operate a mechanical actuator to pull the cord that detaches the movable barrier door from the mechanical motor, allowing manual movement of the barrier without AC power.

The IoT invention can provide buttons and LED indication lights on its CB to test the connection with RC circuit specifically testing function of each buttons.

The IoT invention can use an RC case and buttons for normal operation of the RC. Conversely, it can provide a new set of buttons to simulate the normal operation of the RC without the smart phone, tablet or other Wi-Fi or Bluetooth-enabled devices. The traditional button based operation does not require Wi-Fi, so the invention only needs to be in range of the GD opener, for example.

The IoT invention can be equipped with input sensors, switches, actuators, and, audible and visual output devices. The data from input is passed on to the MQTT server as an example to consumers of the messages, such as database, user interfaces (visualization application on PC/MAC, smart phones, and tablets), and cloud-based controllers.

The MQTT server is shown as an example of messaging component. The message server(s) can reside in a local LAN or WAN (cloud).

The MQTT server with the logic server can be configured to activate an audible and visual alarm; delay a message; and issue email or cell phone text messages after receiving an activation message. After issuing such a warning, the invention waits for a set period of time; after the programmed interval, a RC button push is simulated to activate the GD.

M2M messages are generated by one or more rule-based algorithms in a Logic server that can reside in a local network or in the cloud.

The logic server(s) can reside with a M2M message server, such as MQTT.

Using MQTT QoS, the message is delivered exactly once, ensuring proper activation of the GD.

Each IoT device has a unique key printed on the bottom of the device. This key is used to establish an initial direct connection to provide a key generated by the smart phone. An updated key is used to re-establish a direct secure connection with a smart phone. Using this secure connection, the Wi-Fi name, password, and another key is provided to the IoT device. Using this information, the IoT device connects to the Wi-Fi network then connects to the management server to provide the device information. It then receives the device name, password, and SSL (Secure Socket Layer) client key to connect to the MQTT message server that is configured with a server SSL key. This process allows for both server and client to authenticate.

The invention uses a local instance of the management, logic, and message servers to ensure low latency and limit security exposure.

The invention uses the notification service of the message server. In potentially dangerous situations, such as when a pet is left in an overheated garage, a notification message can be issued to subscribers (both human and machines) describing the conditions and offering up potential mediating actions or immediately execute pre-programmed actions. The invention can notify all subscribers prior to activating the RC. This notification is assembled after a GD activation request is received and can include the following information: human presence, video, picture, time, date, door lock position, GD position, visual warning, and audible warning.

The invention can receive information from other IoT devices, then issue proper warning messages to subscribing IoT devices equipped with visual and audible outputs prior to issuing a message to activate the RC.

An AC power sensor monitors the AC power status and reports the status via the message server where subscribed users applications and IoT devices will receive the message.

The IoT device, when equipped with a battery, monitors and reports status. The period of reporting can be adjusted during an AC power outage.

The invention claimed is:

1. A system for transforming a traditional device lacking networked processing capability into an Internet of Things (IoT) device, the system comprising:
   a Graphical User Interface (GUI);
   a docking station;
   a signal interface being configured to couple with the traditional device to receive and send information;
   a System on Chip (SoC) with network interfaces coupled to the docking station;
   sensors coupled to the SOC;
   a message server;
   a logic server;
   an authentication server; and
   an authorization server;
   wherein:
   the GUI is configured to define and instantiate functionalities of the traditional device in IoT/machine-to-machine (M2M) connected systems-of-systems;
   traditional device functionalities, data from the sensors and other system data are combined using the GUI and the logic server to instantiate new functionalities for the traditional device;
   the docking station is configured to directly couple with the traditional device instantiating the signal interface;
   the signal interface and SoC are configured to convert traditional signals into IoT messages/protocols that are to be disseminated via a network;
   the SoC is configured to publish and subscribe user defined functions tailored for the traditional device;
   the message server is configured to broker published and subscribed requests for the traditional device, and
   the logic and message servers are configured to notify and activate the traditional device functionalities based on schedules and set conditions.

2. The system according to claim 1, further comprising:
   an interconnect signal cable for interconnect signals and alternating current (AC) power; and
   an interconnect signal generator coupled to the interconnect signal cable and the SoC of the system,
   wherein:
   the interconnect signal cable is coupled to smoke detectors, wiring, and the signal interface of the system;
   the SoC of the system is configured to enable the interconnect signal generator to activate the smoke detectors to sound alarms of different intervals based on user defined rules per sensor; and
   the logic and message servers of the system are configured to activate other IoT devices enabling visual and audible alarms, and actuators.

3. The system according to claim 1, further comprising:
   a custom docking station for a remote controller of the traditional device, wherein:
   remote controller functions of the traditional device are enabled, and the system is operatively coupled with the remote controller via the custom docking station; and
   multifactor authentication methods are used via the authentication server and the authorization server, to identify and authorizes a $3^{rd}$ party devices to activate the traditional device.

* * * * *